United States Patent
Kajiyama et al.

(10) Patent No.: US 11,018,339 B2
(45) Date of Patent: May 25, 2021

(54) POSITIVE ELECTRODE ACTIVE MATERIAL FOR NONAQUEOUS ELECTROLYTE SECONDARY BATTERIES, METHOD FOR PRODUCING SAME, AND NONAQUEOUS ELECTROLYTE SECONDARY BATTERY USING SAME

(71) Applicant: BASF TODA BATTERY MATERIALS LLC, Tokyo (JP)

(72) Inventors: Akihisa Kajiyama, Sanyoonoda (JP); Kazumichi Koga, Sanyoonoda (JP); Tsuyoshi Wakiyama, Sanyoonoda (JP); Ryuta Masaki, Sanyoonoda (JP); Takayuki Yamamura, Sanyoonoda (JP); Kazutoshi Matsumoto, Sanyoonoda (JP)

(73) Assignee: BASF TODA Battery Materials LLC, Tokyo (JP)

(*) Notice: Subject to any disclaimer, the term of this patent is extended or adjusted under 35 U.S.C. 154(b) by 117 days.

(21) Appl. No.: 16/148,335

(22) Filed: Oct. 1, 2018

(65) Prior Publication Data
US 2019/0115596 A1    Apr. 18, 2019

Related U.S. Application Data

(63) Continuation of application No. PCT/JP2017/012635, filed on Mar. 28, 2017.

(30) Foreign Application Priority Data

Mar. 30, 2016  (JP) ................................ 2016-067667
Jan. 20, 2017  (JP) ................................ 2017-008699

(51) Int. Cl.
*H01M 4/525*  (2010.01)
*C01G 53/00*  (2006.01)
(Continued)

(52) U.S. Cl.
CPC ............ *H01M 4/525* (2013.01); *C01G 53/42* (2013.01); *C01G 53/50* (2013.01); *C01G 53/66* (2013.01);
(Continued)

(58) Field of Classification Search
None
See application file for complete search history.

(56) References Cited

U.S. PATENT DOCUMENTS

2007/0275303 A1    11/2007  Ishimatsu
2013/0189581 A1    7/2013   Imaizumi
(Continued)

FOREIGN PATENT DOCUMENTS

CN    101719422 A    6/2010
CN    102969496 A    3/2013
(Continued)

OTHER PUBLICATIONS

International Search Report, dated Jun. 13, 2017, in International Application No. PCT/JP2017/012635.
(Continued)

*Primary Examiner* — Sarah A. Slifka
(74) *Attorney, Agent, or Firm* — DLA Piper LLP (US)

(57) ABSTRACT

A positive electrode active material comprises a Li-transition metal-layered oxide represented by the formula: $Li_a(Ni_bCo_cAl_dMe_e)O_2$ (in which Me=Mn, Mg, Ti, Ru, Zr, Nb, Mo, W; $1.00 \leq a \leq 1.15$; $0.25 < b < 1$; $0 < c \leq 0.30$; $0 \leq d \leq 0.05$; $0 \leq e \leq 0.40$), and is constituted of secondary particles formed by aggregation of primary particles. As to a compositional ratio of Li which is derived from unreacted substances or decomposed products in the secondary particles, a variation coefficient (Standard deviation value/Average value) of a Li-compositional ratio: Li/M (M=Ni+Co+Al+Me) is 30% or less. The positive electrode active material hardly deterio- (Continued)

rates even if repeatedly charged/discharged, and enables stable charge/discharge, and then a non-aqueous electrolyte secondary battery is enabled to have an excellent output property and a long lifetime.

10 Claims, 1 Drawing Sheet

(51) Int. Cl.
 *H01M 4/131*  (2010.01)
 *H01M 4/1391*  (2010.01)
 *H01M 4/505*  (2010.01)
 *H01M 10/0525*  (2010.01)
 *H01M 4/02*  (2006.01)

(52) U.S. Cl.
 CPC ......... *H01M 4/131* (2013.01); *H01M 4/1391* (2013.01); *H01M 4/505* (2013.01); *H01M 10/0525* (2013.01); *C01P 2002/60* (2013.01); *C01P 2004/50* (2013.01); *C01P 2004/61* (2013.01); *C01P 2006/40* (2013.01); *H01M 2004/028* (2013.01)

(56) References Cited

U.S. PATENT DOCUMENTS

| | | |
|---|---|---|
| 2013/0221271 A1 † | 8/2013 | Nagase |
| 2014/0087262 A1 | 3/2014 | Imahashi |
| 2015/0221934 A1 | 8/2015 | Hiratsuka |
| 2016/0006030 A1 | 1/2016 | Saka |
| 2018/0026265 A1 | 1/2018 | Kajiyama |

FOREIGN PATENT DOCUMENTS

| | | |
|---|---|---|
| CN | 104241640 A | 12/2014 |
| CN | 104300145 A | 1/2015 |
| CN | 102315429 B | 10/2015 |
| EP | 2 698 351 A1 | 2/2014 |
| JP | 10-321224 A | 12/1998 |
| JP | 2002-151071 A | 5/2002 |
| JP | 2003-059490 A | 2/2003 |
| JP | 2005-255433 A | 9/2005 |
| JP | 2007280723 A2 † | 10/2007 |
| JP | 2007-317576 A | 12/2007 |
| JP | 2008243447 A2 † | 10/2008 |
| JP | 2012-028163 A | 2/2012 |
| JP | 2012-230898 A | 11/2012 |
| JP | 2014-143108 A | 8/2014 |
| JP | 2015-164119 A | 9/2015 |
| KR | 20140016314 A † | 2/2014 |
| WO | WO 2016/002158 A1 | 1/2016 |
| WO | WO 2016/133042 A1 | 8/2016 |

OTHER PUBLICATIONS

Extended European Search Report in European Application No. 17775085.8, dated May 17, 2019.
Office Action in Chinese Application No. 201780020416.1, dated Mar. 3, 2021.

† cited by third party

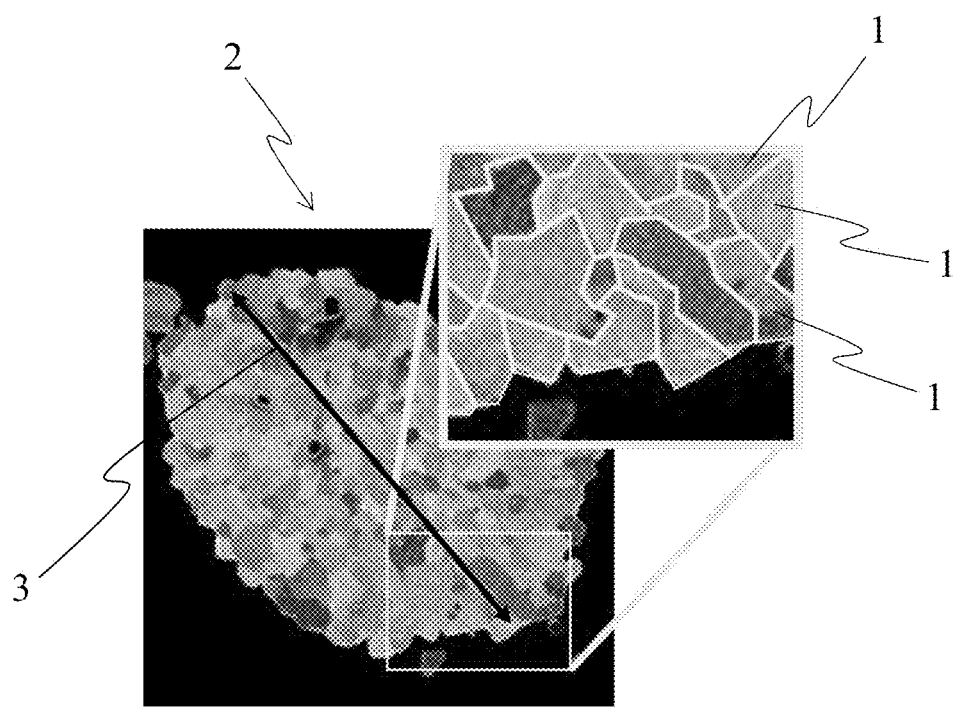

POSITIVE ELECTRODE ACTIVE MATERIAL FOR NONAQUEOUS ELECTROLYTE SECONDARY BATTERIES, METHOD FOR PRODUCING SAME, AND NONAQUEOUS ELECTROLYTE SECONDARY BATTERY USING SAME

CROSS-REFERENCE TO RELATED APPLICATION

This application is a Continuation of International Application No. PCT/JP2017/012635, filed on Mar. 28, 2017, which in turn claims the benefits of Japanese Patent Application No. 2016-067667, filed on Mar. 30, 2016, and Japanese Patent Application No. 2017-008699, filed on Jan. 20, 2017, the disclosures of which Applications are incorporated by reference herein.

BACKGROUND

Field

The present invention relates to positive electrode active materials for non-aqueous electrolyte secondary batteries, methods for producing the same, and non-aqueous electrolyte secondary batteries using the same. Specifically, the present invention relates to positive electrode active materials which hardly deteriorate even if repeatedly charged/discharged and can be stably charged/discharged; methods for producing the same; and non-aqueous electrolyte secondary batteries using the same.

Description of the Related Art

In recent years, portable and cordless electronic devices such as audio-visual (AV) devices and personal computers have been rapidly developed. As a driving power source for these electronic devices, there is an increasing demand for secondary batteries having a small size, a light weight, and a high energy density. Also, in consideration of recent global environment, electric cars and hybrid cars have been developed and put into practice. As a result, there is an increasing demand for lithium ion secondary batteries having an excellent durability, which will be used for a power source having a large size. Under these circumstances, lithium ion secondary batteries having a long lifetime against repeated charge/discharge and an excellent output property have been noticed.

In order to fulfill these demands, in general, there are adopted means of controlling an interfacial reaction between an electrode active material and an electrolytic solution, which is due to insert/release of Li ions during the charge/discharge. Various surface treatments for an active material are examples of the means, and effects therefrom are demonstrated.

In order to improve the output property and the durability of the active material, configuration of secondary particles becomes mainstream, and effects therefrom are demonstrated. The secondary particles are aggregates of fine crystallites of the active material, as behaver units. However, as a distinctive problem shown from such active material of which behaver units are secondary particles, there can be exemplified disintegration of an aggregated form during the charge/discharge, i.e., crack of behaver particles, which causes from grain boundary as origination. Such crack decreases conductive paths and lowers an electrode density, and thus battery properties are sharply lowered. Therefore, in order to furthermore improve performances, it is needed to solve a problem that properties are gradually impaired due to such detachment of crystalline interfaces and the like.

In order to solve such problem, there is reported some prior technic that control of composition of crystalline grain boundary is focused on, which is formed inside the behaver units, in particles of which behaver units are secondary particles, and coating is formed up as far as the crystalline interfaces inside aggregated particles so as to prevent the crystalline interfaces from detaching.

For example of the above technic, there are cited as such prior technics, technics for inhabiting, on the grain boundary in a positive electrode active material which comprises a layered oxide containing Ni, Ti (for example, refer to Japanese Laid-Open Patent Publication No. 2012-028163), Nb (for example, refer to Japanese Laid-Open Patent Publication No. 2002-151071), or a compound containing at least one of Ti, Zr, Hf, Si, Ge, and Sn (for example, refer to Japanese Laid-Open Patent Publication No. 2007-317576), and the like.

However, If only the above technics disclosed in Japanese Laid-Open Patent Publications No. 2012-028163, No. 2002-151071, and No. 2007-317576 are adopted, performances of the positive electrode active material cannot be satisfactory improved. That is, it is difficult to obtain a positive electrode which hardly deteriorates even if repeatedly charged/discharged and can be satisfactory stably charged/discharged.

SUMMARY

The present invention has been accomplished in consideration of the above problems. An object of the present invention is to obtain a positive electrode active material which hardly deteriorates even if repeatedly charged/discharged, and which enables stable charge/discharge, and then, to enable a battery to have an excellent output property and a long lifetime.

As a result of earnest investigation, there has been found that precipitation of Li components as raw materials for a positive electrode active material on the grain boundary becomes to be inhibitor for the lifetime of a battery. Furthermore, there has been found that such precipitation of the Li components on the grain boundary is due to unevenness of a Li concentration in particles, and that such unevenness of the Li concentration is due to excess addition of Li during synthesis of the active material and unsatisfactory mixing of the raw materials.

Therefore, in the present invention, a positive electrode active material for a non-aqueous electrolyte secondary battery is constituted of a Li-transition metal-layered oxide (i.e., layered oxide containing Li and transition metals), and a variation coefficient of the Li concentration in particles of the Li-transition metal-layered oxide is adjusted to 30% or less.

A positive electrode active material according to the present invention, comprises a Li-transition metal-layered oxide represented by the formula:

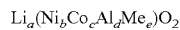

in which Me=Mn, Mg, Ti, Ru, Zr, Nb, Mo, W; 1.00≤a≤1.15; 0.25<b<1; 0<c≤0.33; 0≤d≤0.05; 0≤e≤0.40, wherein the positive electrode active material is constituted of secondary particles formed by aggregation of primary particles; and a variation coefficient (Standard deviation value/Average value) of a Li-compositional ratio: Li/M in which M=Ni+Co+Al+Me, in the secondary particles, is 30% or less, in which a diameter of a cross-section of the secondary particles is at shortest 3 μm, and the standard deviation value and the average value are calculated from a continuously measured compositional ratio as to a linear portion from one end to the opposite end, having a length of at shortest 3 μm, of the secondary particles.

The positive electrode active material according to the present invention is constituted of the layered oxide, and solid solubility area of Li is extremely small in contrast to, for example, an all proportional solid solution such as $LiMn_2O_4$ spinel oxide. Therefore, Li/M which is the ratio of Li to M element (M=Ni, Co, Al, Mn, Mg, Ti, Ru, Zr, Nb, Mo, W) in a crystal just behind synthesis is not greatly different from 1.0. On the other hand, when there are portions where a concentration of the M element (M=Ni, Co, Al, Mn, Mg, Ti, Ru, Zr, Nb, Mo, W) is low inside aggregated behaver particles (secondary particles), there is the crystalline grain boundary therein. A variation of Li/M becomes large due to such lowering of the concentration of the M element on the grain boundary portions and precipitation of Li which is an unreacted substance or a decomposed product. Because the variation coefficient of Li/M is 30% or less in the present invention, the variation of Li/M is small and local compositional deviation is prevented, so that overall the aggregated particles have an average composition. Therefore, the positive electrode active material according to the present invention can prevent the Li component from precipitating on the grain boundary. As a result, the positive electrode active material hardly deteriorates even if repeatedly charged/discharged, and enables stable charge/discharge, and then, enables a battery to have an excellent output property and a long lifetime.

It is preferred that in the positive electrode active material according to the present invention, a plurality of or any of F, Mg, Al, P, Ca, Ti, Y, Sn, Bi, Te, Ce, Zr, La, Mo, Sc, Nb, and W (hereinafter referred to as "A element(s)") exists on the grain boundary of the secondary particles. Because these A elements react with a part of the Li components which are the unreacted substances or the decomposed products to give Li-A-O compounds, the variation coefficient becomes small. In this case, "grain boundary of secondary particles" denotes an interface on which primary particles contact with each other.

As a result of earnest investigation, there has been found that the variation coefficient becomes small by generation of compounds from the A elements and the Li components which are the unreacted substances or the decomposed products and easily precipitate on the grain boundary, so that removal of resistance components is accordingly accomplished in the battery. Furthermore, because these compounds are Li ionic conductors, it is possible to obtain the positive electrode active material which hardly deteriorates even if repeatedly charged/discharged when used for the battery, and enables more stable charge/discharge. The conclusion is derived that the variation coefficient is 30% or less in order to realize excellent battery properties. In Li/M according to the variation coefficient, "Li" means Li element (s) not reacting with the A element(s).

It is preferred that in the positive electrode active material according to the present invention, a crystalline size is 100 nm or more and 600 nm or less, and an average secondary particle diameter is 3.0 μm or more and 20 μm or less.

As to the crystalline size, when the upper limit is more than 600 nm, mechanical aggregation strength of the secondary particles is lowered, so that crack of the aggregates occurs. When the lower limit is less than 100 nm, a grain boundary area within a secondary aggregate structure increases, so that a side reaction becomes a dominant factor of deterioration of battery performances. As to the average secondary particle diameter, when the upper limit is more than 20 μm, diffusion of Li associated with the charge/discharge is prevented, so that input/output property of the battery is lowered. When the lower limit is less than 3.0 μm, the interface of the positive electrode active material and the electrolytic solution increases, so that an undesired side reaction increases. Therefore, it is preferred that the crystalline size is 100 nm or more and 600 nm or less, and the average secondary particle diameter is 3.0 μm or more and 20 μm or less.

A non-aqueous electrolyte secondary battery according to the present invention, comprises the above-mentioned positive electrode active material for a non-aqueous electrolyte secondary battery.

Because the above-mentioned positive electrode active material is used for the non-aqueous electrolyte secondary battery according to the present invention, the secondary battery hardly deteriorates even if repeatedly charged/discharged, and enables stable charge/discharge, and enables to show an excellent output property and a long lifetime.

A method for producing the positive electrode active material, according to the present invention, comprises: a step of preparing a composite compound precursor containing Ni and Co, and optionally containing Al and a Me element, as main components, by a coprecipitation method using a Ni compound and a Co compound, and optionally using a Al compound and a Me compound; a step of preparing a mixture by mixing a lithium compound with the precursor so that a molar ratio of Li to M: Li/M in which M=Ni+Co+Al+Me, is within a range of 1.00 or more to 1.15 or less; a step of baking the mixture under an oxidizing atmosphere at 600° C. or more and 950° C. or less; and a step of annealing a baked mixture at 500° C. or more and 750° C. or less.

By using the method for producing the positive electrode active material, according to the present invention, there can be produced the positive electrode active material as mentioned above, which has the variation coefficient of Li/M of 30% or less, can prevent precipitation of the Li components on the grain boundary, and as a result, hardly deteriorates even if repeatedly charged/discharged and enables stable charge/discharge.

In the method for producing the positive electrode active material, according to the present invention, the composite compound precursor may be prepared by subjecting a compound which contains a metal component comprising a plurality of or any of F, Mg, Al, P, Ca, Ti, Y, Sn, Bi, Te, Ce, Zr, La, Mo, Sc, Nb, and W to the coprecipitation method together with the Ni compound and the Co compound, and optionally together with the Al compound and the Me compound in the step of preparing a precursor.

In place of the above procedure, the method for producing the positive electrode active material, according to the present invention, may further comprise a step of mixing a compound which contains a metal component comprising a plurality of or any of F, Mg, Al, P, Ca, Ti, Y, Sn, Bi, Te, Ce, Zr, La, Mo, Sc, Nb, and W with the mixture.

By using these methods, there can be prevented precipitation of Li which is the unreacted substance or the decomposed product on the grain boundary, and there can be produced the positive electrode active material which hardly deteriorates even if repeatedly charged/discharged in the battery and enables more stable charge/discharge.

It is preferred that after the step of preparing a precursor and before the step of preparing a mixture, the obtained composite compound precursor is subjected to a heat treatment under an oxidizing atmosphere at 400-800° C. for 3-5 hours.

By adopting this procedure, it is possible to decrease a residual carbonate radical in the precursor and to use an oxidized precursor. Thus, the precursor can be easily reacted with Li, and lithium carbonates remaining in the aimed positive electrode active material can be reduced.

Because the positive electrode active material according to the present invention can prevent the Li components from precipitating on the grain boundary, the positive electrode active material hardly deteriorates even if repeatedly charged/discharged in the battery and enables stable charge/discharge. Furthermore, because the non-aqueous electrolyte secondary battery according to the present invention is produced by using the above-mentioned positive electrode active material, the secondary battery can have an excellent output property and a long lifetime.

BRIEF DESCRIPTION OF THE DRAWINGS

This and other objects and features of the present invention will become clear from the following description, taken in conjunction with the exemplary embodiments with reference to the accompanied drawings in which:

FIG. 1 shows a schematic diagram for measuring a compositional ratio of a cross-section of secondary particles in Example.

DETAILED DESCRIPTION

Hereinafter, embodiments for implementing the present invention are described. The following descriptions of preferred embodiments are merely essential examples, and do not intend to limit the present invention, a method for applying the same, and a use of the same.

Firstly, is described the positive electrode active material for a non-aqueous electrolyte secondary battery, according to one embodiment of the present invention.

The positive electrode active material according to the present embodiment has the variation coefficient of a Li-compositional ratio of 30% or less. The Li-compositional ratio is a ratio of Li which is the unreacted substance or the decomposed product to Ni, Co, Al, and Me (Me=Mn, Mg, Ti, Ru, Zr, Nb, Mo, W) which are bulk principal components. The positive electrode active material comprises the layered oxide represented by the formula:

$$Li_a(Ni_bCo_cAl_dMe_e)O_2$$

(in which, $1.00 \leq a \leq 1.15$, $0.25 < b < 1$, $0 < c \leq 0.30$, $0 \leq d \leq 0.05$, $0 \leq e \leq 0.40$).

As mentioned above, in the present embodiment, because the variation coefficient of the Li-compositional ratio (Li/M (M=Ni+Co+Al+Me)) in the secondary particles of the positive electrode active material is 30% or less, the variation of Li/M is small and a local compositional deviation is prevented, so that overall the aggregated particles have an average composition. Therefore, in the battery, an initial resistance inside the secondary particles due to precipitation of Li can be lowered and generation of the resistance components during cycles can be reduced. As a result, crack of the aggregated form during the repeated charge/discharge and deterioration of battery performances due to the crack can be reduced. A more preferred variation coefficient is 28% or less, and a furthermore preferred variation coefficient is 27% or less. The lower limit is zero. As to the lower limit, this shall not apply in the case Li/M on the grain boundary is less than that inside the crystal.

As to a more preferred composition of the positive electrode active material according to the present embodiment, in the formula: $Li_a(Ni_bCo_cAl_dMe_e)O_2$, a range of "a" (Li/M) is 1.00-1.15, a more preferred range of "a" is 1.00-1.12, a furthermore preferred range of "a" is 1.00-1.10, a range of "b" is 0.30-0.98, a range of "c" is 0.05-0.35, a range of "d" is 0-0.05, and a range of "e" is 0-0.35. Specifically, when the range of "a" is adjusted to the above range, entering of Ni into Li-site which is 3a-site can be prevented because the composition becomes to be not stoichiometry but Li-rich condition.

It is preferred that the positive electrode active material according to the present embodiment contains dissimilar metals on the grain boundary of the secondary particles, such as F, Mg, Al, P, Ca, Ti, Y, Sn, Bi, Te, Ce, Zr, La, Mo, Sc, Nb, and W. Thus, these dissimilar metals react with a small amount of the Li components (Li components which are the unreacted substances or the decomposed products) on the grain boundary to give Li compounds, and the Li compounds serve as a sort of the Li ionic conductor. As a result, precipitation of the Li components on the grain boundary can be prevented. The above dissimilar metals may be substituted with metals and contained within a crystal lattice of the positive electrode active material. Also in such case, it is considered that the dissimilar metals move onto the grain boundary of the secondary particles by the repeated charge/discharge in the battery. It is considered that, as a result, the dissimilar metals can react with the Li components which are the decomposed products on the grain boundary, and the above-mentioned effects can be exhibited. The dissimilar metals may exist on a surface of the secondary particles as well as on the grain boundary of the secondary particles.

It is preferred that the crystalline size of the positive electrode active material according to the present invention is 100-600 nm. When the upper limit is more than 600 nm, the mechanical aggregation strength of the secondary particles is lowered, so that crack of the aggregates occurs. When the lower limit is less than 100 nm, the grain boundary area within the secondary aggregate structure increases, so that the side reaction becomes the dominant factor of deterioration of the battery performances. A more preferred crystalline size is 150-500 nm.

It is preferred that the average secondary particle diameter of the positive electrode active material according to the present embodiment is 3.0-20 μm. When the upper limit is more than 20 μm, diffusion of Li associated with the charge/discharge is prevented, so that the input/output property of the battery is lowered. When the lower limit is less than 3.0 μm, the interface of the positive electrode active material and the electrolytic solution increases, so that the undesired side reaction increases. A more preferred average secondary particle diameter is 4.0-19 μm.

Then, is described the method for producing a positive electrode active material, according to one embodiment of the present invention. The positive electrode active material according to the present embodiment can be produced by, for example, the following method.

A wet coprecipitation reaction is performed by continuously supplying a mixed aqueous solution of nickel sulfate and cobalt sulfate to an aqueous solution of which pH is adjusted to an optimum value, so as to give spherical nickel-cobalt type composite compound particles as the precursor. It is preferred that the spherical nickel-cobalt type composite compound particles are composite hydroxides.

Then, the precursor is mixed with the lithium compound to give a mixture in which a molar ratio: Li/(Ni+Co) is adjusted to a prescribed range, for example, 1.00-1.15 or so. The mixture is baked under the oxidizing atmosphere at 600-950° C. During cooling after such baking or after once cooling, also an annealing can be performed under the oxidizing atmosphere, an atmosphere, an oxygen atmosphere and the like at 500-750° C. The annealing can reduce the variation coefficient of the Li-compositional ratio: Li/M in the secondary particles of the obtained positive electrode active material. Thus, the positive electrode active material according to the present embodiment can be produced. The above description relates to a positive electrode active material containing no Al and Me elements. However, a positive electrode active material may be prepared after composite compound particles as the precursor are prepared by further using the Al compound and/or the Me compound, of course.

In the present embodiment, the dissimilar metals such as F, Mg, Al, P, Ca, Ti, Y, Sn, Bi, Te, Ce, Zr, La, Mo, Sc, Nb, and W may be added, and there is no limitation on an adding period. The dissimilar metals may be added during the wet coprecipitation reaction or after the reaction by a dry mixing.

It is preferred that the composite compound particles are prepared so as to have the crystalline size of 100-600 nm, the average secondary particle diameter of 3-20 μm, and a BET specific surface area of 0.15-1.0 $m^2/g$. In some cases, a grinding treatment and the like may be performed.

In the present embodiment, various lithium salts can be used as the lithium compounds without specific limitations. For example, are cited lithium hydroxide monohydrate, lithium nitrate, lithium carbonate, lithium acetate, lithium bromide, lithium chloride, lithium citrate, lithium fluoride, lithium iodide, lithium lactate, lithium oxalate, lithium phosphate, lithium pyruvate, lithium sulfate, lithium oxide, and the like. Preferable example is lithium carbonate or lithium hydroxide monohydrate.

In the present embodiment, the molar ratio of Li to M: Li/M in the mixture of the precursor and the Li compound is 1.00-1.15. When Li/M is less than 1.00, Ni enters into the Li-site in a crystal structure, so that mono-crystal phase cannot be formed and this becomes a factor lowering the battery performances. When Li/M is more than 1.15, an excess amount of Li, which is more than a stoichiometric amount, becomes a factor of the resistance components, so that this causes lowering of the battery performances. A more preferred molar ratio of Li to M: Li/M is 1.00-1.12, and a furthermore preferred Li/M is 1.00-1.10.

In the present embodiment, an atmosphere for baking the mixture of the precursor and the Li compound is the oxidizing atmosphere, and a preferred oxygen content is 20% by volume or more. When the oxygen content is less than the above value, Li ions enter into a transition metal-site, so that this causes lowering of the battery performances. The upper limit of the oxygen content is not specifically limited.

In the present embodiment, a baking temperature is preferably 600-950° C. When the baking temperature is lower than 600° C., diffusion energy of the elements fails, so that the crystal structure having the aimed thermal equilibrium state cannot be achieved and a monolayer cannot be formed. When the baking temperature is higher than 950° C., deficit of oxygen occurs in a crystal due to reduction of the transition metals, so that the aimed monolayer of the crystal structure cannot be formed. A preferred baking time is 5-20 hours, and a furthermore preferred baking time is 5-15 hours.

It is preferred that the annealing after the baking is performed at a temperature range of 500-750° C. under the oxidizing atmosphere or the oxygen atmosphere. When an annealing temperature is lower than 500° C., the diffusion energy of the elements fails, so that Li which is the unreacted substance or the decomposed product cannot diffuse onto the grain boundary by reacting with the A elements. As a result, the variation of the composition cannot be reduced as desired, that is, the variation coefficient of Li/M cannot be adjusted to 30% or less. When the annealing temperature is higher than 750° C., activity of oxygen fails, so that a rock salt structural oxide of the transition metals, which is an impurity phase, generates. A more preferred annealing temperature is 550-730° C., and a furthermore preferred annealing temperature is 580-700° C. A preferred annealing time is 3-20 hours, and a furthermore preferred annealing time is 3-15 hours. It is preferred that the annealing after the baking is performed subsequently to the baking.

It is needed that the annealing temperature is lower than the baking temperature in order to satisfactory exhibit effects by the annealing. It is more preferred that the annealing is performed at a temperature which is 30° C. or more lower than the baking temperature.

Then, is described the non-aqueous electrolyte secondary battery according to one embodiment of the present invention.

The non-aqueous electrolyte secondary battery according to the present embodiment is constituted of a positive electrode containing the above-mentioned positive electrode active material, a negative electrode, and an electrolyte. The non-aqueous electrolyte secondary battery according to the present invention can be used even if an operating voltage or a voltage associated with initial crystalline phase transition is 4.5V or less in terms of a lithium reference.

A positive electrode mixture used in the present invention is not specifically limited. For example, the positive electrode mixture is prepared by kneading the positive electrode active material, a conductive agent and a binder in a ratio of Positive electrode active material:Conductive agent:Binder=90:5:5.

As a negative electrode active material, there can be used lithium metal, a lithium/aluminum alloy, a lithium/tin alloy, silicon, a silicon/carbon composite, graphite, and the like.

As a solvent of the electrolytic solution, there can be used an organic solvent including at least one of carbonates basically comprising propylene carbonate (PC), dimethyl carbonate (DMC) and the like, and ethers comprising dimethoxyethane (DME) and the like, as well as a combination of ethylene carbonate (EC) and diethyl carbonate (DEC).

As the electrolyte, there can be used by being dissolved to the above-mentioned solvent at least one of lithium salts such as lithium perchlorate ($LiClO_4$) and lithium tetrafluoroborate ($LiBF_4$), as well as lithium hexafluorophosphate ($LiPF_6$).

An important fact in the present invention is that the non-aqueous electrolyte secondary battery produced by using the positive electrode active material according to the present invention can be stably charged/discharged with hardly any deterioration of capacity during the repeated charge/discharge from a lower temperature to a higher temperature.

In the present invention, when is repeatedly charged/discharged a Li-transition metal oxide as the positive electrode active material of which behaver units are aggregated secondary particles, the side reaction which occurs on a crystalline surface, i.e., grain boundary, is prevented. As a result, deterioration of battery capacity can be reduced. The side reaction is a reaction which is due to increase of electric double layers induced by a high resistance on the interface, and the like. The side reactions due to these are detachment of the grain boundary by side reaction products on the grain boundary, and furthermore, lowering of conductivity within the behaver units of the secondary particles, decomposition of organic impurities, dissolution and precipitation of metallic impurities, and the like, which are caused by the detachment, and expansion of electrodes and the like macroscopically.

In the present invention, as mentioned above, because the variation coefficient of the Li-compositional ratio: Li/M in the secondary particles of the positive electrode active material is 30% or less, the variation of Li/M is small and the local compositional deviation is prevented, so that overall the aggregated particles have an average composition. Therefore, in the battery, the initial resistance inside the secondary particles due to precipitation of Li which is the unreacted substance or the decomposed product can be lowered and generation of the resistance components during cycles can be reduced. As a result, crack of the aggregated form during the repeated charge/discharge and deterioration of the battery performances due to the crack can be reduced.

In addition to this, in the present invention, it is preferred that on the grain boundary of the secondary particles exist the dissimilar metals such as F, Mg, Al, P, Ca, Ti, Y, Sn, Bi, Te, Ce, Zr, La, Mo, Sc, Nb, and W, in order to improve stability. This is based on the following knowledges. That is, there becomes to be the inhibitor for the lifetime of the battery that the Li components which are the unreacted substances or the decomposed products derived from the law materials precipitate on the grain boundary among the primary particles. By further developing this fact, there can be considered that especial excess Li components (Li components which are the unreacted substances or the decomposed products) react with the dissimilar metals on the grain boundary inside the aggregated secondary particles (on fracture surface of the aggregated secondary particles in Examples described later), the Li ionic conductors generate, so that the resistance components on the grain boundary are reduced. As a result, there can be considered that stable charge/discharge can be realized with hardly any deterioration of capacity during the repeated charge/discharge from a lower temperature to a higher temperature.

Specific examples of the present invention and comparative examples are shown below. Firstly, various measuring methods as to the positive electrode active materials in the examples and the comparative examples are described.

In the positive electrode active material, sections of the crystalline grain boundary and the crystal structure inside crystal particles near the grain boundary were confirmed in accordance with identification of a cross-section obtained by Ar ion milling, by using a TEM image (multiple wave interference image) and a selected-area electron diffraction pattern which were obtained at an accelerating voltage of 300 keV.

In the positive electrode active material, an ion distribution in a cross-section of the secondary particles including the sections of the crystalline grain boundary and the grain boundary was confirmed by a secondary ion mass spectrometry method. Specifically, by using a secondary ion mass spectrometer Nano-SIMS50L (commercially available from AETEK CAMECA), $Cs^+$ ions were accelerated at 8 keV and narrowed down to a diameter of 100 nm or less, a cut cross-section to be observed was irradiated with the $Cs^+$ ions in units of 60 nm, and then, secondary ions generated from a sample were identified. Thus, distributional conditions of Ni which was a main element and the like, with inclusion of Li having a fine spatial resolution of 60-100 nano-order, were measured.

A cross-section to be observed of the aggregated particle was obtained by cutting the positive electrode active material encapsulated within a resin with an ion milling. A diameter of the cross-section was adjusted to at shortest 3 μm. As to a linear portion from one end to the opposite end of the aggregated particle, having a length of at shortest 3 μm, the compositional ratio was continuously measured. A standard deviation value and an average value were calculated, and the variation coefficient (Standard deviation value/Average value) was obtained.

The schematic diagram for this measurement is shown in FIG. 1. The positive electrode active material according to the present invention comprises the second particle(s) 2 which is(are) formed by aggregating a lot of primary particles (crystal particles) 1. As to the cross-section to be observed of the secondary particle 2 encapsulated within the resin, the linear portion 3 having a prescribed length was selected, and the compositional ratio was measured.

As a supplementary analysis, comparison of Ni-distribution between FIB-SIM image and Nano-SIMS was carried out preliminarily, and then it was confirmed that the Ni-distribution from the Nano-SIMS coincides with a practical position of the grain boundary.

In turn, a conditional analysis of the transition metals near the grain boundary, i.e., near the crystalline surface was carried out by using STEM-EELS under the condition that the accelerating voltage was 200 keV, a beam diameter was 0.2 nm, and an irradiation current was 1.00 nA.

By using a coin cell having 2032 size, was measured repeating charge/discharge property of the positive electrode mixture containing the positive electrode active material according to the present embodiment. The coin cell having the above-mentioned size was manufactured in accordance with the following procedures. That is, were mixed 90% by weight of a Li-transition metal-layered oxide as the positive electrode active material, 5% by weight of carbon black as the conductive agent and 5% by weight of polyvinylidene fluoride as the binder, which was dissolved in N-methylpyrrolidone, and then, Al metallic foil was coated with an obtained mixture and dried at 110° C. to give a sheet. A sample sheet having a diameter of 16 mm was stamped out from this sheet and crimped under 3.0 t/cm² to give the positive electrode. Lithium metallic foil was used as the negative electrode. In a solvent prepared by mixing EC with DMC in a volume ratio of EC:DMC=1:2 was dissolved 1 mol/L of $LiPF_6$ to give the electrolytic solution.

The repeating charge/discharge property was measured in accordance with the following procedures. That is, the above-mentioned coin cell was charged to 4.3V at 0.5 C rate (CC-CV), and then, the coin cell was discharged to 3.0V at 1 C rate (CC). This cycle was repeated 100 times, and capacity retention was calculated. This measurement was performed in a thermostatic chamber adjusted to 60° C.

The average secondary particle diameter (D50) is an average particle diameter by a volume standard. The average particle diameter was measured by a wet laser method using a laser type particle size distribution measuring apparatus Microtrack HRA (commercially available from NIKKISO CO., LTD.).

The crystalline size of the positive electrode active material particles was calculated in accordance with the following procedures. That is, by using a X-ray diffractometer SmartLab (commercially available from Rigaku Corporation), a step-and-scan method was performed under the condition that a slit was ⅔ degree, a scan range of 2θ/θ was 10-90°, a sampling interval was 0.02°, and a scan speed was 1.2°/min. Then, Rietvelt analysis was performed by using text data and the crystalline size was calculated.

In Rietvelt analysis, values when S value was 1.3 or less were used. For an analyzing method, for example, R. A. Young, ed., "The Rietvelt Method", Oxford University Press (1992) was used as a reference.

EXAMPLE 1

A sodium hydroxide aqueous solution was prepared so as to have pH=12.0 in a reactor equipped with a mixing blade. Thereinto was dropped an ammonia aqueous solution so that an ammonia concentration was adjusted to 0.80 mol/L. To the reactor was continuously supplied a mixture solution containing nickel sulfate, cobalt sulfate and manganese sulfate so that the compositional ratio was adjusted to Ni/Co/Mn=0.8/0.1/0.1. During these procedures, the sodium hydroxide aqueous solution and the ammonia aqueous solution were continuously supplied so that a reacting solution had pH of 12 and the ammonia concentration of 0.8 mol/L, and reaction was continued so as to achieve the aimed average secondary particle diameter. During these procedures, a spherical deposit of a composite transition metal was obtained by applying mechanical shear force to a suspension.

After the above-mentioned reaction, a taken suspension was washed with water by using a filter press, and then dried at 150° C. for 12 hours to give nickel-cobalt-manganese type compound particles (nickel-cobalt-manganese composite hydroxide particles=precursor). These composite hydroxide particles and lithium hydroxide monohydrate were mixed with each other so that a molar ratio was adjusted to Li/(Ni+Co+Mn)=1.02 to give a mixture.

After the mixture was baked under the oxidizing atmosphere at 750° C. for 10 hours, the mixture was subjected to the heat treatment as the annealing under the oxidizing atmosphere at 650° C. for 7 hours, and then crushed. As a result of ICP spectroscopy, a chemical composition of an obtained baked product was $Li_{1.02}Ni_{0.8}Co_{0.1}Mn_{0.1}O_2$. The average secondary particle diameter was 10.4 μm, and the crystalline size was 462 nm.

The obtained $Li_{1.02}Ni_{0.8}Co_{0.1}Mn_{0.1}O_2$ was mixed with $ZrO_2$ so that a ratio was adjusted to $Zr/Li_{1.02}Ni_{0.8}Co_{0.1}Mn_{0.1}O_2$=0.01 to give a mixture. The mixture was additionally baked at 650° C. for 7 hours to give a final product. The original crystalline size was not changed due to this additional baking.

As to the cross-section of these particles, an elemental distribution analysis was performed by using the above-mentioned Nano-SIMS. As a result, the variation coefficient of Li/M in the crystal and on the grain boundary was 24.6%. It was also confirmed that Zr coexisted on the grain boundary where the Li concentration was high.

As a supplementary measurement, the multiple wave interference image and the selected-area electron diffraction pattern were measured by a high resolution TEM, and the STEM-EELS analysis was performed, from the grain boundary to inside the crystal at intervals of 20 nm. As a result, it was confirmed that the crystal structure near the grain boundary had a structure belonging to a space group R-3m, similarly to the bulk, and that there was no reduction of the transition metals.

The coin cell was manufactured in accordance with the above-mentioned method by using the above-mentioned final product as the positive electrode active material, and measurement for charge/discharge cycle thereof was performed. As a result, a retention was 99.6%.

EXAMPLE 2

The positive electrode active material was produced in the same manner as in Example 1 except for the following procedures. That is, a mixing ratio of each compound was changed so that the compositional ratio of a precursor became to Ni/Co/Mn=1.0/1.0/1.0. A ratio of Li to metals constituting the precursor was adjusted as shown in Table 1. A mixture of lithium hydroxide monohydrate, the precursor, $ZrO_2$ and $La_2O_3$ was baked under the oxidizing atmosphere at 850° C. for 10 hours. Then, the mixture was subjected to the heat treatment as the annealing under an atmosphere at 630° C. for 8 hours and crushed to give positive electrode active material powder.

As to the cross-section of these particles, the elemental distribution analysis was performed by using the Nano-SIMS. As a result, the variation coefficient of Li/M in the crystal and on the grain boundary was 26.7%. It was also confirmed that Zr coexisted on the grain boundary where the Li concentration was high.

As the supplementary measurement, the multiple wave interference image and the selected-area electron diffraction pattern were measured by the high resolution TEM, and the STEM-EELS analysis was performed, from the grain boundary to inside the crystal at the intervals of 20 nm. As a result, it was confirmed that the crystal structure near the grain boundary had a structure belonging to a space group R-3m, similarly to the bulk, and that there was no reduction of the transition metals.

The coin cell was manufactured in accordance with the above-mentioned method by using the obtained positive electrode active material, and measurement for the charge/discharge cycle thereof was performed. As a result, the retention was 99.1%.

EXAMPLE 3

A sodium hydroxide aqueous solution was prepared so as to have pH=12.0 in a reactor equipped with a mixing blade. Thereinto was dropped an ammonia aqueous solution so that an ammonia concentration was adjusted to 0.80 mol/L. To the reactor was continuously supplied a mixture solution containing nickel sulfate, cobalt sulfate and sodium aluminate. During these procedures, the sodium hydroxide aqueous solution and the ammonia aqueous solution were continuously supplied so that a reacting solution had pH of 12 and the ammonia concentration of 0.8 mol/L, and reaction was continued so as to achieve the aimed average secondary particle diameter. During these procedures, a spherical deposit of a composite transition metal was obtained by applying the mechanical shear force to a suspension.

The positive electrode active material was produced in the same manner as in Example 1 except for the following procedures. That is, after the above-mentioned reaction, a taken suspension was washed with water by using the filter press, and then dried at 150° C. for 12 hours to give nickel-cobalt-aluminum type compound particles (nickel-cobalt-aluminum composite hydroxide particles=precursor). This obtained precursor was subjected to the heat treatment in the atmosphere at 580° C. for 5 hours. The compositional ratio of the precursor was recognized as Ni/Co/Al=0.95/0.02/0.03. A ratio of Li to metals constituting the precursor was adjusted as shown in Table 1. A mixture of lithium hydroxide monohydrate, the precursor and $WO_3$ was baked under the oxidizing atmosphere at 740° C. for 10 hours. Then, the mixture was subjected to the heat treatment as the annealing under an oxygen atmosphere at 660° C. for 5 hours and crushed to give positive electrode active material powder.

As to the cross-section of these particles, the elemental distribution analysis was performed by using the Nano-SIMS. As a result, the variation coefficient of Li/M in the crystal and on the grain boundary was 26.5%. It was also confirmed that W coexisted on the grain boundary where the Li concentration was high.

As the supplementary measurement, the multiple wave interference image and the selected-area electron diffraction pattern were measured by the high resolution TEM, and the STEM-EELS analysis was performed, from the grain boundary to inside the crystal at the intervals of 20 nm. As a result, it was confirmed that the crystal structure near the grain boundary had a structure belonging to a space group R-3m, similarly to the bulk, and that there was no reduction of the transition metals.

The coin cell was manufactured in accordance with the above-mentioned method by using the obtained positive electrode active material, and measurement for the charge/discharge cycle thereof was performed. As a result, the retention was 98.0%.

EXAMPLE 4

A sodium hydroxide aqueous solution was prepared so as to have pH=12.0 in a reactor equipped with a mixing blade. Thereinto was dropped an ammonia aqueous solution so that an ammonia concentration was adjusted to 0.80 mol/L. To the reactor was continuously supplied a mixture solution containing nickel sulfate, cobalt sulfate, sodium aluminate, manganese sulfate and magnesium sulfate. During these procedures, the sodium hydroxide aqueous solution and the ammonia aqueous solution were continuously supplied so that a reacting solution had pH of 12 and the ammonia concentration of 0.8 mol/L, and reaction was continued so as to achieve the aimed average secondary particle diameter. During these procedures, a spherical deposit of a composite transition metal was obtained by applying the mechanical shear force to a suspension.

The positive electrode active material was produced in the same manner as in Example 1 except for the following procedures. That is, after the above-mentioned reaction, a taken suspension was washed with water by using the filter press, and then dried at 150° C. for 12 hours to give nickel-cobalt-aluminum-manganese-magnesium type compound particles (nickel-cobalt-aluminum-manganese-magnesium composite hydroxide particles=precursor). This obtained precursor was subjected to the heat treatment in the atmosphere at 600° C. for 5 hours. The compositional ratio of the precursor was recognized as Ni/Co/Al/Mn/Mg=0.92/0.02/0.03/0.02/0.01. A ratio of Li to metals constituting the precursor was adjusted as shown in Table 1. A mixture of lithium hydroxide monohydrate, the precursor and $ZrO_2$ was baked under the oxidizing atmosphere at 740° C. for 10 hours. Then, the mixture was subjected to the heat treatment as the annealing under the oxygen atmosphere at 600° C. for 4 hours and crushed to give positive electrode active material powder.

As to the cross-section of these particles, the elemental distribution analysis was performed by using the Nano-SIMS. As a result, the variation coefficient of Li/M in the crystal and on the grain boundary was 25.3%. It was also confirmed that Zr coexisted on the grain boundary where the Li concentration was high.

As the supplementary measurement, the multiple wave interference image and the selected-area electron diffraction pattern were measured by the high resolution TEM, and the STEM-EELS analysis was performed, from the grain boundary to inside the crystal at the intervals of 20 nm. As a result, it was confirmed that the crystal structure near the grain boundary had a structure belonging to a space group R-3m, similarly to the bulk, and that there was no reduction of the transition metals.

The coin cell was manufactured in accordance with the above-mentioned method by using the obtained positive electrode active material, and measurement for the charge/discharge cycle thereof was performed. As a result, the retention was 98.0%.

EXAMPLE 5

A sodium hydroxide aqueous solution was prepared so as to have pH=12.0 in a reactor equipped with a mixing blade. Thereinto was dropped an ammonia aqueous solution so that an ammonia concentration was adjusted to 0.80 mol/L. To the reactor was continuously supplied a mixture solution containing nickel sulfate, cobalt sulfate, sodium aluminate and titanyl sulfate. During these procedures, the sodium hydroxide aqueous solution and the ammonia aqueous solution were continuously supplied so that a reacting solution had pH of 12 and the ammonia concentration of 0.8 mol/L, and reaction was continued so as to achieve the aimed average secondary particle diameter. During these procedures, a spherical deposit of a composite transition metal was obtained by applying the mechanical shear force to a suspension.

The positive electrode active material was produced in the same manner as in Example 1 except for the following procedures. That is, after the above-mentioned reaction, a taken suspension was washed with water by using the filter press, and then dried at 150° C. for 12 hours to give nickel-cobalt-aluminum-titanium type compound particles (nickel-cobalt-aluminum-titanium composite hydroxide particles=precursor). This obtained precursor was subjected to the heat treatment in the atmosphere at 630° C. for 5 hours. The compositional ratio of the precursor was recognized as Ni/Co/Al/Ti=0.91/0.05/0.03/0.01. A ratio of Li to metals constituting the precursor was adjusted as shown in Table 1. A mixture of lithium hydroxide monohydrate, the precursor and $Nb_2O_5$ was baked under the oxidizing atmosphere at 750° C. for 10 hours. Then, the mixture was subjected to the heat treatment as the annealing under the oxygen atmosphere at 660° C. for 5 hours and crushed to give positive electrode active material powder.

As to the cross-section of these particles, the elemental distribution analysis was performed by using the Nano-SIMS. As a result, the variation coefficient of Li/M in the crystal and on the grain boundary was 26.8%. It was also confirmed that Nb coexisted on the grain boundary where the Li concentration was high.

As the supplementary measurement, the multiple wave interference image and the selected-area electron diffraction pattern were measured by the high resolution TEM, and the STEM-EELS analysis was performed, from the grain boundary to inside the crystal at the intervals of 20 nm. As a result, it was confirmed that the crystal structure near the grain boundary had a structure belonging to a space group R-3m, similarly to the bulk, and that there was no reduction of the transition metals.

The coin cell was manufactured in accordance with the above-mentioned method by using the obtained positive electrode active material, and measurement for the charge/discharge cycle thereof was performed. As a result, the retention was 96.7%.

EXAMPLE 6

A sodium hydroxide aqueous solution was prepared so as to have pH=12.0 in a reactor equipped with a mixing blade. Thereinto was dropped an ammonia aqueous solution so that an ammonia concentration was adjusted to 0.80 mol/L. To the reactor was continuously supplied a mixture solution containing nickel sulfate, cobalt sulfate, sodium aluminate and ruthenium sulfate. During these procedures, the sodium hydroxide aqueous solution and the ammonia aqueous solution were continuously supplied so that a reacting solution had pH of 12 and the ammonia concentration of 0.8 mol/L, and reaction was continued so as to achieve the aimed average secondary particle diameter. During these procedures, a spherical deposit of a composite transition metal was obtained by applying the mechanical shear force to a suspension.

The positive electrode active material was produced in the same manner as in Example 1 except for the following procedures. That is, after the above-mentioned reaction, a taken suspension was washed with water by using the filter press, and then dried at 150° C. for 12 hours to give nickel-cobalt-aluminum-ruthenium type compound particles (nickel-cobalt-aluminum-ruthenium composite hydroxide particles=precursor). This obtained precursor was subjected to the heat treatment in the atmosphere at 580° C. for 5 hours. The compositional ratio of the precursor was recognized as Ni/Co/Al/Ru=0.70/0.20/0.05/0.05. A ratio of Li to metals constituting the precursor was adjusted as shown in Table 1. A mixture of lithium hydroxide monohydrate, the precursor and $Y_2O_3$ was baked under the oxidizing atmosphere at 730° C. for 10 hours. Then, the mixture was subjected to the heat treatment as the annealing under the oxygen atmosphere at 620° C. for 4 hours and crushed to give positive electrode active material powder.

As to the cross-section of these particles, the elemental distribution analysis was performed by using the Nano-SIMS. As a result, the variation coefficient of Li/M in the crystal and on the grain boundary was 24.5%. It was also confirmed that Y coexisted on the grain boundary where the Li concentration was high.

As the supplementary measurement, the multiple wave interference image and the selected-area electron diffraction pattern were measured by the high resolution TEM, and the STEM-EELS analysis was performed, from the grain boundary to inside the crystal at the intervals of 20 nm. As a result, it was confirmed that the crystal structure near the grain boundary had a structure belonging to a space group R-3m, similarly to the bulk, and that there was no reduction of the transition metals.

The coin cell was manufactured in accordance with the above-mentioned method by using the obtained positive electrode active material, and measurement for the charge/discharge cycle thereof was performed. As a result, the retention was 98.9%.

EXAMPLE 7

A sodium hydroxide aqueous solution was prepared so as to have pH=12.0 in a reactor equipped with a mixing blade. Thereinto was dropped an ammonia aqueous solution so that an ammonia concentration was adjusted to 0.80 mol/L. To the reactor was continuously supplied a mixture solution containing nickel sulfate, cobalt sulfate, sodium aluminate and manganese sulfate. During these procedures, the sodium hydroxide aqueous solution and the ammonia aqueous solution were continuously supplied so that a reacting solution had pH of 12 and the ammonia concentration of 0.8 mol/L, and reaction was continued so as to achieve the aimed average secondary particle diameter. During these procedures, a spherical deposit of a composite transition metal was obtained by applying the mechanical shear force to a suspension.

The positive electrode active material was produced in the same manner as in Example 1 except for the following procedures. That is, after the above-mentioned reaction, a taken suspension was washed with water by using the filter press, and then dried at 150° C. for 12 hours to give nickel-cobalt-aluminum-manganese type compound particles (nickel-cobalt-aluminum-manganese composite hydroxide particles=precursor). This obtained precursor was subjected to the heat treatment in the atmosphere at 600° C. for 5 hours. The compositional ratio of the precursor was recognized as Ni/Co/Al/Mn=0.92/0.08/0.02/0.02. A ratio of Li to metals constituting the precursor was adjusted as shown in Table 1. A mixture of lithium hydroxide monohydrate, the precursor and $TeO_2$ was baked under the oxidizing atmosphere at 750° C. for 10 hours. Then, the mixture was subjected to the heat treatment as the annealing under the oxygen atmosphere at 630° C. for 5 hours and crushed to give positive electrode active material powder.

As to the cross-section of these particles, the elemental distribution analysis was performed by using the Nano-SIMS. As a result, the variation coefficient of Li/M in the crystal and on the grain boundary was 25.5%. It was also confirmed that Te coexisted on the grain boundary where the Li concentration was high.

As the supplementary measurement, the multiple wave interference image and the selected-area electron diffraction pattern were measured by the high resolution TEM, and the STEM-EELS analysis was performed, from the grain boundary to inside the crystal at the intervals of 20 nm. As a result, it was confirmed that the crystal structure near the grain boundary had a structure belonging to a space group R-3m, similarly to the bulk, and that there was no reduction of the transition metals.

The coin cell was manufactured in accordance with the above-mentioned method by using the obtained positive electrode active material, and measurement for the charge/discharge cycle thereof was performed. As a result, the retention was 98.5%.

EXAMPLE 8

A sodium hydroxide aqueous solution was prepared so as to have pH=12.0 in a reactor equipped with a mixing blade. Thereinto was dropped an ammonia aqueous solution so that an ammonia concentration was adjusted to 0.80 mol/L. To the reactor was continuously supplied a mixture solution containing nickel sulfate, cobalt sulfate, sodium aluminate, magnesium sulfate and molybdenum oxide. During these procedures, the sodium hydroxide aqueous solution and the ammonia aqueous solution were continuously supplied so that a reacting solution had pH of 12 and the ammonia concentration of 0.8 mol/L, and reaction was continued so as to achieve the aimed average secondary particle diameter.

During these procedures, a spherical deposit of a composite transition metal was obtained by applying the mechanical shear force to a suspension.

The positive electrode active material was produced in the same manner as in Example 1 except for the following procedures. That is, after the above-mentioned reaction, a taken suspension was washed with water by using the filter press, and then dried at 150° C. for 12 hours to give nickel-cobalt-aluminum-magnesium-molybdenum type compound particles (nickel-cobalt-aluminum-magnesium-molybdenum composite hydroxide particles=precursor). This obtained precursor was subjected to the heat treatment in the atmosphere at 570° C. for 5 hours. The compositional ratio of the precursor was recognized as Ni/Co/Al/Mg/Mo=0.80/0.10/0.05/0.02/0.03. A ratio of Li to metals constituting the precursor was adjusted as shown in Table 1. A mixture of lithium hydroxide monohydrate, the precursor and $NH_4H_2PO_3$ was baked under the oxidizing atmosphere at 760° C. for 10 hours. Then, the mixture was subjected to the heat treatment as the annealing under the oxygen atmosphere at 640° C. for 6 hours and crushed to give positive electrode active material powder.

As to the cross-section of these particles, the elemental distribution analysis was performed by using the Nano-SIMS. As a result, the variation coefficient of Li/M in the crystal and on the grain boundary was 27.3%. It was also confirmed that P coexisted on the grain boundary where the Li concentration was high.

As the supplementary measurement, the multiple wave interference image and the selected-area electron diffraction pattern were measured by the high resolution TEM, and the STEM-EELS analysis was performed, from the grain boundary to inside the crystal at the intervals of 20 nm. As a result, it was confirmed that the crystal structure near the grain boundary had a structure belonging to a space group R-3m, similarly to the bulk, and that there was no reduction of the transition metals.

The coin cell was manufactured in accordance with the above-mentioned method by using the obtained positive electrode active material, and measurement for the charge/discharge cycle thereof was performed. As a result, the retention was 98.2%.

Comparative Example 1

The positive electrode active material was produced in the same manner as in Example 1 except for the following procedures. That is, a mixing ratio of each compound was changed so that the compositional ratio of a precursor became to Ni/Co/Mn=0.6/0.2/0.2. A ratio of Li to metals constituting the precursor was adjusted as shown in Table 1. A mixture of lithium hydroxide monohydrate and the precursor was baked under the oxidizing atmosphere at 750° C. for 10 hours. Then, the mixture was subjected to no annealing and was crushed to give active material powder.

As to the cross-section of these particles, the elemental distribution analysis was performed by using the Nano-SIMS. As a result, the variation coefficient of Li/M in the crystal and on the grain boundary was 32.0%.

As the supplementary measurement, the multiple wave interference image and the selected-area electron diffraction pattern were measured by the high resolution TEM, and the STEM-EELS analysis was performed, from the grain boundary to inside the crystal at the intervals of 20 nm. As a result, it was confirmed that the crystal structure except for near the grain boundary had a structure belonging to a space group R-3m, similarly to the bulk, and that there was no reduction of the transition metals. However, it was confirmed that the transition metals entered into the Li-site only nearest the grain boundary, and simultaneously that there was energy shift of EELS suggesting reduction of the transition metals.

The coin cell was manufactured in accordance with the above-mentioned method by using the obtained positive electrode active material, and measurement for the charge/discharge cycle thereof was performed. As a result, the retention was 90.0%.

Comparative Example 2

The positive electrode active material was produced in the same manner as in Example 1 except for the following procedures. That is, a mixing ratio of each compound was changed so that the compositional ratio of a precursor became to Ni/Co/Mn=0.5/0.2/0.3. A ratio of Li to metals constituting the precursor was adjusted as shown in Table 1. A mixture of lithium hydroxide monohydrate and the precursor was baked under the oxidizing atmosphere at 950° C. for 10 hours. Then, the mixture was subjected to no annealing and was crushed to give active material powder.

As to the cross-section of these particles, the elemental distribution analysis was performed by using the Nano-SIMS. As a result, the variation coefficient of Li/M in the crystal and on the grain boundary was 28.8%.

As the supplementary measurement, the multiple wave interference image and the selected-area electron diffraction pattern were measured by the high resolution TEM, and the STEM-EELS analysis was performed, from the grain boundary to inside the crystal at the intervals of 20 nm. As a result, it was confirmed that the crystal structure except for near the grain boundary had a structure belonging to a space group R-3m, similarly to the bulk, and that there was no reduction of the transition metals. However, it was confirmed that the transition metals entered into the Li-site only nearest the grain boundary, and simultaneously that there was energy shift of EELS suggesting reduction of the transition metals.

The coin cell was manufactured in accordance with the above-mentioned method by using the obtained positive electrode active material, and measurement for the charge/discharge cycle thereof was performed. As a result, the retention was 96.2%.

Comparative Example 3

A sodium hydroxide aqueous solution was prepared so as to have pH=12.0 in a reactor equipped with a mixing blade. Thereinto was dropped an ammonia aqueous solution so that an ammonia concentration was adjusted to 0.80 mol/L. To the reactor was continuously supplied a mixture solution containing nickel sulfate, cobalt sulfate and sodium aluminate. During these procedures, the sodium hydroxide aqueous solution and the ammonia aqueous solution were continuously supplied so that a reacting solution had pH of 12 and the ammonia concentration of 0.8 mol/L, and reaction was continued so as to achieve the aimed average secondary particle diameter. During these procedures, a spherical deposit of a composite transition metal was obtained by applying the mechanical shear force to a suspension.

The positive electrode active material was produced in the same manner as in Example 1 except for the following procedures. That is, after the above-mentioned reaction, a taken suspension was washed with water by using the filter press, and then dried at 150° C. for 12 hours to give nickel-cobalt-aluminum type compound particles (nickel-cobalt-aluminum composite hydroxide particles=precursor). This obtained precursor was subjected to the heat treatment in the atmosphere at 570° C. for 5 hours. The compositional ratio of the precursor was recognized as Ni/Co/Al=0.80/0.15/0.05. A ratio of Li to metals constituting the precursor was adjusted as shown in Table 1. A mixture of lithium hydroxide monohydrate and the precursor was baked under the oxidizing atmosphere at 750° C. for 10 hours. Then, the mixture was subjected to no annealing and was crushed to give active material powder.

As to the cross-section of these particles, the elemental distribution analysis was performed by using the Nano-SIMS. As a result, the variation coefficient of Li/M in the crystal and on the grain boundary was 34.0%.

As the supplementary measurement, the multiple wave interference image and the selected-area electron diffraction pattern were measured by the high resolution TEM, and the STEM-EELS analysis was performed, from the grain boundary to inside the crystal at the intervals of 20 nm. As a result, it was confirmed that the crystal structure except for near the grain boundary had a structure belonging to a space group R-3m, similarly to the bulk, and that there was no reduction of the transition metals. However, it was confirmed that the transition metals entered into the Li-site only nearest the grain boundary, and simultaneously that there was energy shift of EELS suggesting reduction of the transition metals.

The coin cell was manufactured in accordance with the above-mentioned method by using the obtained positive electrode active material, and measurement for the charge/discharge cycle thereof was performed. As a result, the retention was 95.0%.

As to each of the positive electrode active materials obtained in Examples 1-8 and Comparative Examples 1-3, various characteristics including the variation coefficient of Li/M and the charge/discharge property are shown in Table 1.

From the above results, it has been clarified that excellent in repeating charge/discharge property are the secondary batteries manufactured by using each of the positive electrode active materials in Examples 1-8, which have characteristics of the positive electrode active material according to the present invention, in comparison with the secondary batteries manufactured by using each of the positive electrode active materials in Comparative Examples 1-3.

Because the positive electrode active material according to the present invention has a large discharge capacity and exhibits an excellent cycle property, the material is suitable as a positive electrode active material for a non-aqueous electrolyte secondary battery.

As described above, embodiments have been described as examples of art in the present invention. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present invention, it is understood that various modifications, replacements, additions, omissions, and the like can be performed in the scope of the claims or in an equivalent scope thereof

What is claimed is:

1. A positive electrode active material for a non-aqueous electrolyte secondary battery, comprising a Li-transition metal-layered oxide represented by the formula:

$$Li_a(Ni_bCo_cAl_dMe_e)O_2$$

in which Me=Mn, Mg, Ti, Ru, Zr, Nb, Mo, W; $1.00 \leq a \leq 1.15$; $0.25 < b < 1$; $0 < c \leq 0.33$; $0 \leq d \leq 0.05$; $0 \leq e \leq 0.40$, wherein
the positive electrode active material is constituted of secondary particles formed by aggregation of primary particles;
a variation coefficient, which is a ratio of a standard deviation value to an average value, of a Li-compositional ratio: Li/M in which M=Ni+Co+Al+Me, in the secondary particles, is 28.0% or less, in which a diameter of a cross-section of the secondary particles is at shortest 3 μm, and the standard deviation value and the average value are calculated from a continuously measured compositional ratio as to a linear portion from one end to the opposite end, having a length of at shortest 3 μm, of the secondary particles; and
an A element which is at least one of F, Mg, Al, P, Ca, Ti, Y, Sn, Bi, Te, Ce, Zr, La, Mo, Sc, Nb, and W exists on grain boundary of the secondary particles, in which the A element is a dissimilar metal, does not construct the secondary particles and reacts with a part of Li components which are unreacted components or decomposed products to give a Li-A-O compound serving as a Li ionic conductor, and the grain boundary of the

TABLE 1

| | Composition | Annealing Temperature (° C.) | Annealing Time (hr) | Variation coefficient of Li/M (%) | Cycle (101st/1st) retention (%) | Average secondary particle diameter (μm) | Crystalline size (nm) | Dopant |
|---|---|---|---|---|---|---|---|---|
| Ex. 1 | $Li_{1.02}Ni_{0.8}Co_{0.1}Mn_{0.1}O_2$ | 650 | 7 | 24.6 | 99.6 | 10.4 | 462 | Zr |
| Ex. 2 | $Li_{1.05}Ni_{0.33}Co_{0.33}Mn_{0.33}O_2$ | 630 | 8 | 26.7 | 99.1 | 9.13 | 556 | La, Zr |
| Ex. 3 | $Li_{1.01}Ni_{0.95}Co_{0.02}Al_{0.03}O_2$ | 660 | 5 | 26.5 | 98.0 | 10.3 | 300 | W |
| Ex. 4 | $Li_{1.01}Ni_{0.92}Co_{0.02}Al_{0.03}Mn_{0.02}Mg_{0.01}O_2$ | 600 | 4 | 25.3 | 98.0 | 11.2 | 342 | Zr |
| Ex. 5 | $Li_{1.01}Ni_{0.91}Co_{0.05}Al_{0.03}Ti_{0.01}O_2$ | 660 | 5 | 26.8 | 96.7 | 12.1 | 435 | Nb |
| Ex. 6 | $Li_{1.02}Ni_{0.70}Co_{0.20}Al_{0.05}Ru_{0.05}O_2$ | 620 | 4 | 24.5 | 98.9 | 11.5 | 356 | Y |
| Ex. 7 | $Li_{1.01}Ni_{0.92}Co_{0.08}Al_{0.02}Mn_{0.02}O_2$ | 630 | 5 | 25.5 | 98.5 | 11.8 | 451 | Te |
| Ex. 8 | $Li_{1.01}Ni_{0.80}Co_{0.10}Al_{0.05}Mg_{0.02}Mo_{0.03}O_2$ | 640 | 6 | 27.3 | 98.2 | 12.3 | 392 | P |
| Com. Ex. 1 | $Li_{1.01}Ni_{0.6}Co_{0.2}Mn_{0.2}O_2$ | — | — | 32.0 | 90.0 | 9.13 | 556 | — |
| Com. Ex. 2 | $Li_{1.04}Ni_{0.5}Co_{0.2}Mn_{0.3}O_2$ | — | — | 28.8 | 96.2 | 10.4 | 462 | — |
| Com. Ex. 3 | $Li_{1.01}Ni_{0.8}Co_{0.15}Al_{0.05}O_2$ | — | — | 34.0 | 95.0 | 10.4 | 462 | Al | secondary particles is an interface on which primary particles contact with each other.

2. The positive electrode active material according to claim 1, wherein
a crystalline size is 100 nm or more and 600 nm or less, and
an average secondary particle diameter is 3.0 μm or more and 20 μm or less.

3. The positive electrode active material according to claim 1, wherein
a crystalline size is 100 nm or more and 600 nm or less, and
an average secondary particle diameter is 3.0 μm or more and 20 μm or less.

4. A non-aqueous electrolyte secondary battery comprising the positive electrode active material according to claim 1.

5. A method for producing the positive electrode active material according to claim 1, comprising:
a step of preparing a composite compound precursor containing Ni and Co, and optionally containing Al and Me element, as main components, by a coprecipitation method using a Ni compound and a Co compound, and optionally using a Al compound and a Me compound;
a step of preparing a mixture by mixing a lithium compound with the precursor so that a molar ratio of Li to M: Li/M in which M=Ni+Co+Al+Me, is within a range of 1.00 or more to 1.15 or less;
a step of baking the mixture under an oxidizing atmosphere at 600° C. or more and 950° C. or less; and
a step of annealing a baked mixture at 500° C. or more and 750° C. or less, subsequently to the step of baking the mixture.

6. The method for producing the positive electrode active material, according to claim 5, wherein
in the step of preparing a composite compound precursor, a compound which contains a metal component comprising at least one of F, Mg, Al, P, Ca, Ti, Y, Sn, Bi, Te, Ce, Zr, La, Mo, Sc, Nb, and W is subjected to the coprecipitation method together with the Ni compound and the Co compound, and optionally together with the Al compound and the Me compound, to give the composite compound precursor.

7. The method for producing the positive electrode active material, according to claim 6, wherein
after the step of preparing a composite compound precursor and before the step of preparing a mixture, the composite compound precursor is subjected to a heat treatment under an oxidizing atmosphere at 400-800° C. for 3-5 hours.

8. The method for producing the positive electrode active material, according to claim 5, further comprising:
a step of mixing a compound which contains a metal component comprising at least one of F, Mg, Al, P, Ca, Ti, Y, Sn, Bi, Te, Ce, Zr, La, Mo, Sc, Nb, and W, with the mixture.

9. The method for producing the positive electrode active material, according to claim 8, wherein
after the step of preparing a composite compound precursor and before the step of preparing a mixture, the composite compound precursor is subjected to a heat treatment under an oxidizing atmosphere at 400-800° C. for 3-5 hours.

10. The method for producing the positive electrode active material, according to claim 5, wherein
after the step of preparing a composite compound precursor and before the step of preparing a mixture, the composite compound precursor is subjected to a heat treatment under an oxidizing atmosphere at 400-800° C. for 3-5 hours.

* * * * *